Figure 1:
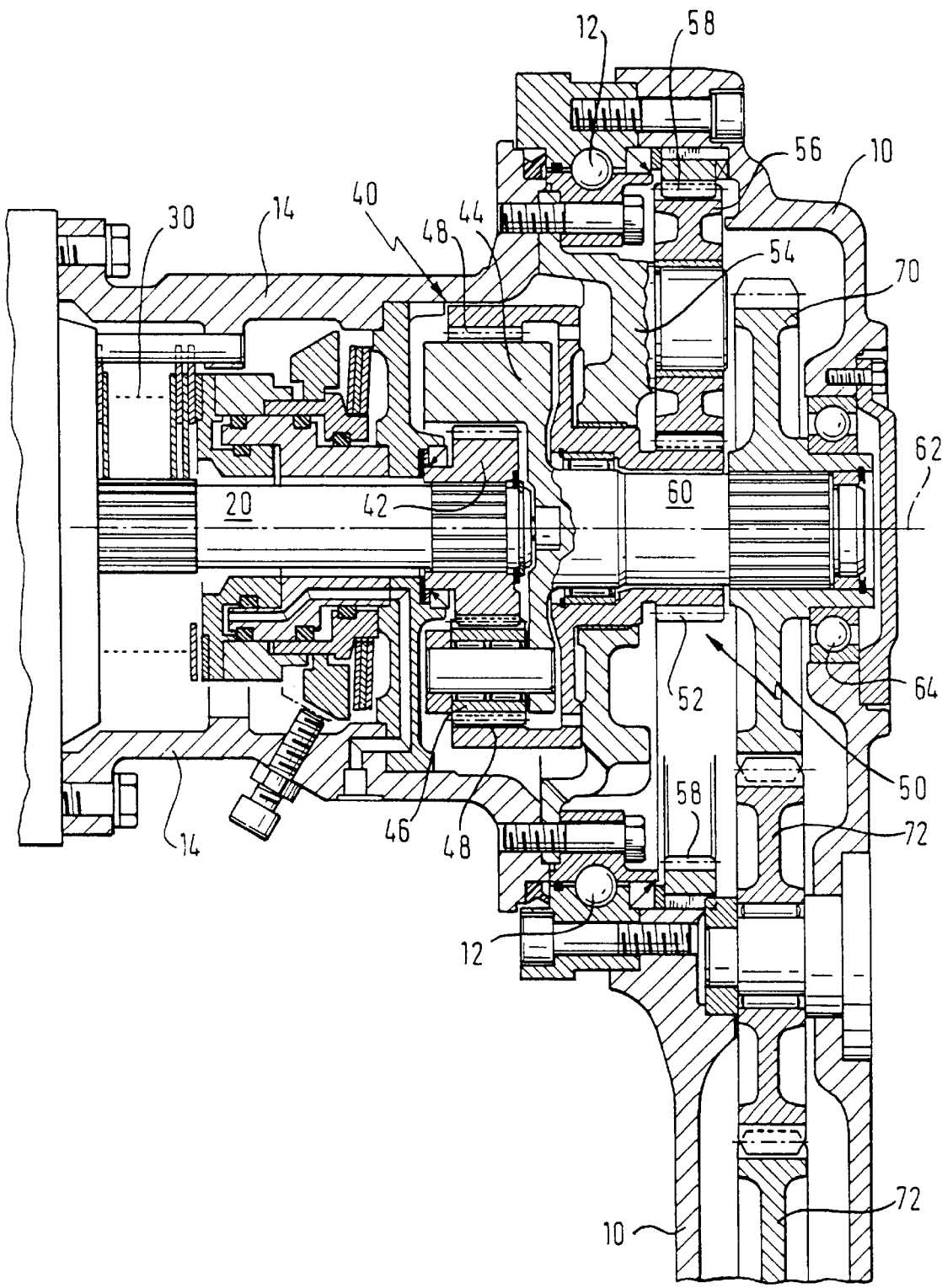

United States Patent
Auer

[11] Patent Number: 6,053,837
[45] Date of Patent: Apr. 25, 2000

[54] DRIVE UNIT FOR A TANDEM AXLE

[75] Inventor: Ernst Auer, Munich, Germany

[73] Assignee: Neunkirchener Maschinen - Und Achsenfabrik GmbH & Co. KG, Germany

[21] Appl. No.: 09/173,461

[22] Filed: Oct. 14, 1998

[30] Foreign Application Priority Data

Oct. 15, 1997 [DE] Germany .......................... 197 45 560
Jan. 22, 1998 [DE] Germany .......................... 198 02 371

[51] Int. Cl.[7] .......................... F16H 48/06; B62D 61/10
[52] U.S. Cl. .................. 475/221; 475/225; 180/24.11
[58] Field of Search .................. 475/220, 221, 475/225, 248, 330, 331, 332, 337; 180/24.11, 24.09, 24.08, 24.05, 24.04

[56] References Cited

U.S. PATENT DOCUMENTS

| | | | |
|---|---|---|---|
| 1,839,785 | 1/1932 | Church | 475/225 X |
| 2,737,829 | 3/1956 | Wilson | 475/221 |
| 3,786,888 | 1/1974 | Nelson | 180/24.11 |
| 3,976,154 | 8/1976 | Clark et al. | 475/221 X |
| 4,359,914 | 11/1982 | Meisel | 475/331 X |
| 4,560,018 | 12/1985 | Satzler | 180/24.03 X |
| 4,941,539 | 7/1990 | Kopczynski | 180/24.08 X |
| 5,290,201 | 3/1994 | Tesker | 180/24.11 X |
| 5,417,297 | 5/1995 | Auer | 180/24.11 |

FOREIGN PATENT DOCUMENTS

| | | |
|---|---|---|
| 2522542 | 2/1976 | Germany . |
| 4120801 | 8/1993 | Germany . |

*Primary Examiner*—Charles A. Marmor
*Assistant Examiner*—Scott Lund
*Attorney, Agent, or Firm*—Stoel Rives LLP

[57] ABSTRACT

A drive unit for tandem axles with two planetary transmissions is proposed, wherein a second planetary transmission is a "measuring" transmission interposed in such a manner between a chassis and a rocker of the tandem axle that the difference required for lifting the axle is determined and balanced.

2 Claims, 2 Drawing Sheets

DRIVE UNIT FOR A TANDEM AXLE

The present invention relates to a drive unit for a driving axle of a self-propelled machine. To be more precise, it relates to a tandem axle having a twin armed rocker provided on the side of a chassis. Driven wheels are mounted on the ends of said rocker.

Vehicles or machines of this kind are for example used as construction, agricultural or forestry machines for work on rough terrain. The torque from an engine is introduced into the independent axle of the rockers via a cardan shaft, a differential and a planetary transmission. A drive unit of this kind is disclosed in DE-AS 25 22 542. In this prior art drive unit, the torque is introduced into the rockers via an axle tube independently mounted in the vehicle frame.

For vehicles used on rough terrain by contrast, it is preferred that the rocker be mounted directly on the vehicle frame and so that it can only be swung about its independent axle. The deflection gears, power dividers and speed reduction gears not only need to ensure uniform distribution of the torque to the driving wheels but also—and this is the essential object of the present invention—constant road adhesion of the wheels on rough terrain. What is especially important is that the gear wheels of an interposed planetary transmission must not be exposed to momentary load moments, which may be generated by the driving wheels on rough terrain, without ensuring immediate balancing thereof.

According to the present invention, this object is generally accomplished in that a second planetary transmission is interposed in such a manner that a toothed ring of a speed reductive first planetary transmission is supported by a sun wheel of the second planetary transmission. A toothed ring of said second planetary transmission is firmly connected to said rocker and a web of said second planetary transmission is firmly connected to a chassis. In this manner, the "measuring" and balancing or differential second planetary transmission is obtained between said chassis and said rocker. The shaft torque delivered by the differential to the said first planetary transmission is geared in the said second planetary transmission, said torque at the same time being measured by means of a support moment in the toothed ring which is proportional to the input moment or the driven moment. This support moment is introduced into the rocker via the second planetary transmission at the point spaced from a rocking axis of said rocker.

The effect of said two torques will advantageously result in a sufficiently large restoring moment in each case which may be adapted to the practical requirements by appropriate selection of the transmission ratios.

While it is disclosed in DE 41 20 801 C2 to insert two planetary transmissions in the path between the differential and the rocker, these two planetary transmissions are series-mounted.

In this case, the toothed ring of the planetary transmission at the drive end is supported by the chassis and the toothed ring of the planetary transmission at the wheel end is supported by the rocker. This arrangement, too, will generate a restoring moment, if necessary. However, since the planet wheels of both transmissions are of same size here, identical transmission ratios will be obtained—which does make sense for the direct drive path.

In contrast, the transmission ratio between the first and the second planetary transmission according to the present invention may be selected differently, depending on the practical requirements.

Further details, features and advantages of the present invention may be gathered from the description, which follows, of an embodiment illustrated in the drawing as well as a numerical example in comparison to the prior art.

BACKGROUND AND SUMMARY OF THE INVENTION

Figure 2:
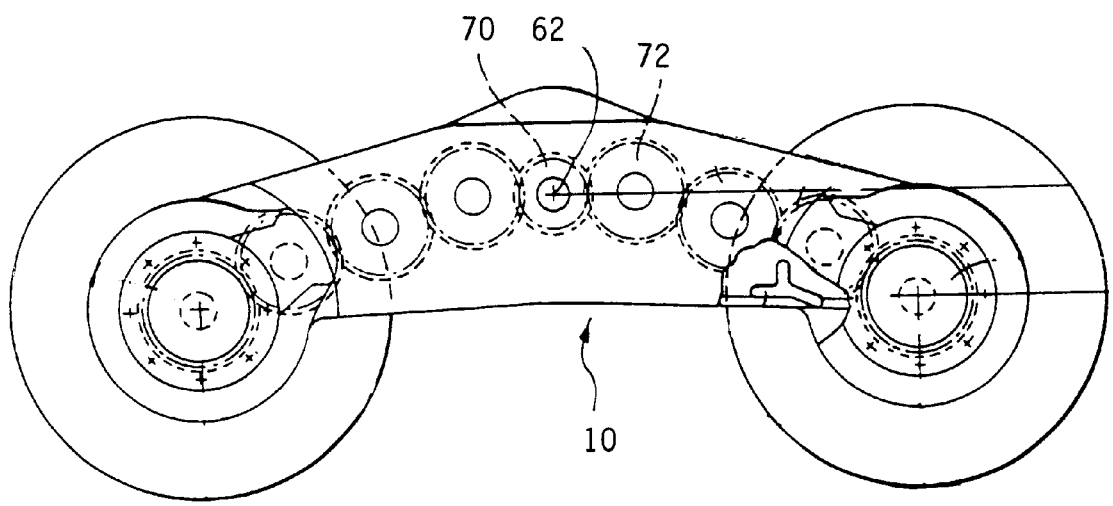

FIG. 1 is a sectional view of an embodiment of the invention. A rocker 10 is articulated on a chassis 14 by means of a bearing 12. A driving shaft 20, which is connected to a multiple-disc brake 30, extends from a differential (not shown) to a sun wheel 42 of a first or "turning" planetary transmission 40. As already set out above, a planet wheel supporting web 44 of said first planetary transmission 40 is connected to a driven shaft 60 extending coaxially to a rocking axis 62 and running in bearings 64 in the rocker 10. Mounted on said driven shaft 60 is a gear 70 which—as is known—meshes with further gears 72 on both sides in said rocker 10, thus transmitting the torque to the wheels (FIG. 2) mounted on either end of said rocker 10.

The planet wheels 46 are mounted on web 44 and engage with a toothed ring 48 which is connected to a sun wheel 52 of a second or "measuring" planetary transmission 50. Planet wheels 56 mounted on a web 54 engage with a toothed ring 58 which is firmly connected to said rocker 10. Said web 54 is firmly connected to said chassis 14.

It is to be noted that above said gear wheel 70 as shown in the present view, the rocker 10 also extends to a second driving wheel (FIG. 2), if not in the drawing plane of the shown view. This is due to the fact that the rocker 10 need not be of straight shape. In a practical implementation, the rockers frequently form an obtuse angle whose legs extend downwards, with said axis 62 forming the angle point, as is implied in FIG. 3 of DE 41 20 801 C2.

In the following, figures are given for an embodiment of the present invention. For this purpose, an axle is assumed to have the following specifications:

| | | |
|---|---|---|
| Axle | | 16,000 kg |
| Tyre radius | | 570 mm |
| Superelevation of rocker | | 200 mm |
| Wheelbase | | 1,500 mm |
| Ground friction value | | 0.8 |
| Transmission | | 23.294 |
| Distribution of the transmission ratios | | |
| Differential | 2.067 | |
| | | $\left(\frac{31}{15}\right)$ |
| "Measuring planet" 50 | 3.0 | |
| | | $\left(\frac{70}{35}+1\right)$ |
| "Turning planet" 40 | 4.0 | |
| | | $\left(\frac{88}{22}\right)$ |
| Rocker | 0.7878 | |
| | | $\left(\frac{26}{33}\right)$ |
| Portal | 1.052 | |
| | | $\left(\frac{20}{19}\right)$ |
| Planet terminal position | 4.53 | |
| Total: 2.067 * 3 * 0.7878 * 1.052 * 4.53 = 23.28 | | |

Wheel torque with $\mu=0.8$; r=0.57 m and a load of 8 t (=80 kM)

$$M_{rad}=80,000*0.8*0.57=36,480 \text{ Nm}$$

Side shaft $$T_{ss} = \frac{36,480}{4.53 * 1.052 * 0.7878 * 3} = 3,239N$$

Support moment of the toothed ring of the first planetary transmission 40:

3,239*($i_{M_{ei}}$−1)=6,478 Nm=input torque in said second planetary transmission 50.

Output torque in said second planetary transmission 50:

6,478*4=25,912 Nm

Output torque of central spur gear 70

=3,239*$i_{MA}$=3,239*3=9,717 Nm

Total restoring torque of the rocker 10:

$M_{RS}$=25,911+9,717=35,628 Nm

Lifting moment due to tractive power:
Tractive power:

80,000*0.8=64,000

$M_A$=64,000(0.57+0.2)=49,280 Nm

Differential torque:

$M_D$=49,280−35,628=13,652 Nm

Differential load on wheels:

$$\text{Differential load on wheels: } \Delta R = \frac{13,652}{1.5} = 9,101N$$

$$\text{Wheel load 1: } 40,000 - 9,101 = 30,899N$$

$$2: 40,000 + 9,101 = 49,101N$$

$$\text{Ratio 2/1: } \frac{49,101}{30,899} = 1.59$$

Comparison of a rocker as disclosed in DE 41 20 801 C2 using the same basic data and an effective transmission ratio of 1.82: Lifting moment $M_A$=49,280 Nm $$\text{Torque of central spur gear} = \frac{36,480}{1.82} = 20,043Nm$$

Differential torquue:

49,280−20,043=29,236 Nm

Differential load on wheels:

$$\frac{29,236}{1.5} = 19,490N$$

Wheels load 1:

40,000+19,490=20,510 N

Wheels load 2:

40,000+19,490=59,490 N

Ratio 2/1:

$$\frac{59,490}{20,509} = 2.90$$

Improvement:

$$\frac{2.9}{1.58} = 1.83 \rightarrow 83\%$$

better or balanced.

In order to have the same "degree of balancing" as obtained with a solution according to DE 41 20 801, an effective transmission ratio of 1.376 would have to be obtained, i.e. a BB planetary drive transmission ratio of 7.57 (instead of 5.71). Since such transmission ratios will be confronted with the same torque as a ratio of 5.71, a larger design (approx. 30% larger on average) would be required. For example $$\frac{84}{14} + 1 = 7.71$$

$$\frac{90}{14} + 1 = 7.42$$

Diameter of toothed ring:

90*4.5=405

36%

66*4.5=297

This in turn would require a larger toothed ring, a larger support ring as well as a rocker of increased total height.

Compared to the prior art, equally good or better values are obtained for the ground adhesion forces and the constructional dimensions.

What is claimed is:

1. A drive unit for a driving axle of a self-propelled machine usable on rough terrain, comprising:
   a twin-armed rocker provided on a side of a chassis, with a driven wheel mounted on distal ends of said rocker;
   a drive torque being introduced into said rocker via a first planetary transmission mounted about a rocking axis of said rocker;
   a first toothed ring of said first planetary transmission connected to a sun wheel of a second planetary transmission;
   a second toothed ring of said second planetary transmission firmly connected to said rocker; and
   a web of said second planetary transmission firmly connected to the chassis spaced at a distance from said rocking axis.

2. The drive unit as claimed in claim 1 characterized in that, owing to planet wheels of different sizes, said second planetary transmission has different transmission ratios as compared to said first planetary transmission.

* * * * *

UNITED STATES PATENT AND TRADEMARK OFFICE
CERTIFICATE OF CORRECTION

PATENT NO : 6,053,837
DATED : April 25, 2000
INVENTOR(S): Ernst Auer

It is certified that error appears in the above-identified patent and that said Letters Patent are hereby corrected as shown below:

Column 3, line 35, delete "differential load on Wheel".

Column 3, line 52, "torquue" should read --torque--.

Column 3, lines 60 - 62, "Wheels load 1: 40,000+ 19,490=20,510 N" should read --Wheel load 1: 40,000-19,490=20,510 N--.

Column 3, line 64, "Wheels" should read --wheel--.

Column 4, line 25, Application page 6, line 33, "$\underline{84} + 1 = 7.71$
$14$
$\underline{90} + 1 = 7.42$" should read
$14$ --$\underline{84} + 1 = 7.71$
$14$
or
$\underline{90} + 1 = 7.42$--
$14$ Signed and Sealed this Seventeenth Day of April, 2001

Attest:

NICHOLAS P. GODICI

*Attesting Officer*     *Acting Director of the United States Patent and Trademark Office*